United States Patent [19]
Nonaka et al.

[11] Patent Number: 5,471,441
[45] Date of Patent: Nov. 28, 1995

[54] CD PLAYER CAPABLE OF PLAYING BACK PARTIALLY RECORDED CD

[75] Inventors: Yoshiya Nonaka; Yoshio Aoyagi; Hiroyuki Abe; Alex Bradshaw; Kazuhiro Kiyoura; Seiji Kato; Koichiro Haraguchi, all of Kawagoe, Japan

[73] Assignee: Pioneer Electronic Corporation, Tokyo, Japan

[21] Appl. No.: 7,856

[22] Filed: Jan. 22, 1993

[30] Foreign Application Priority Data

Jan. 24, 1992 [JP] Japan ................... 4-011437
Jan. 24, 1992 [JP] Japan ................... 4-011438
Jan. 24, 1992 [JP] Japan ................... 4-011439

[51] Int. Cl.$^6$ ........................................ G11B 17/22
[52] U.S. Cl. ........................... 369/32; 369/47; 369/58
[58] Field of Search .................... 369/32, 33, 13, 369/44.26, 44.29, 44.33, 275.2, 48, 284, 53, 54, 58, 59, 124, 111, 47, 50; 360/72.2, 78.08, 78.14; 358/342

[56] References Cited

U.S. PATENT DOCUMENTS

| | | | |
|---|---|---|---|
| 5,153,861 | 10/1992 | Maeda et al. ................ | 369/32 |
| 5,177,728 | 1/1993 | Otsubo et al. ................ | 369/48 |
| 5,228,021 | 7/1993 | Sato et al. ................ | 369/58 |
| 5,414,684 | 5/1995 | Nonaka et al. ................ | 369/47 |

Primary Examiner—Ali Neyzari
Attorney, Agent, or Firm—Sughrue, Mion, Zinn, Macpeak & Seas

[57] ABSTRACT

A CD player capable of detecting the recording end of a partially recorded CD-R (PRD) during playback. When an unrecorded area (URA) is detected, an address immediately before that of the URA is held and a setup is performed at the position of that detection. If the setup is unsuccessful, a setup is performed at a reference setup position, and when this setup operation is complete, playback starts from the held address position. When the playback from the position and detection of the URA are repeated a predetermined number of times, the held address position is discriminated as the recording end. According to a method of searching for the last piece of recorded information in the program area on a PRD, when reading failure occurs in a search, the pickup is moved back to a previous jump position to the occurrence of the reading failure. Then a search is conducted through a jump over tracks equal to or less in number than the number of tracks of a predetermined smallest amount of information from that jump position, and the last piece (e.g., song) is detected by a sub code acquired at a jump position immediately previous to the re-occurrence of reading failure. A CD player capable of ensuring reproduction of all the pieces of recorded information during playback of a PRD updates the last track number to the newly detected track number when detecting a next track number in an area following an area of a memorized last track number during playback of a PRD.

22 Claims, 13 Drawing Sheets

(a) CD (b) CD-R BLANK DISK (c) CD-R PARTIALLY RECORDED DISK (PRD)

(d) CD-R FINALIZED DISK

(a)

TNO=99 SEARCH

(b)

SEARCH FOR PROGRAM AREA
(10-Tr-JUMP)

(c)

PLAYBACK AFTER HEAD IS SEARCHED

(d)

TNO=99 SEARCH (a)

(b)

(c)

(d)

CD PLAYER CAPABLE OF PLAYING BACK PARTIALLY RECORDED CD

BACKGROUND OF THE INVENTION

1. Field of the Invention

The present invention relates to a CD (Compact Disk) player, and more particularly, to a CD player capable of playing back a partially recorded, additionally recordable CD-R (CD Recordable).

2. Description of the Related Art

The CD is well known as a recording medium to record acoustic information or the like. The CD has a lead-in area LIA where index information of recorded information is recorded, a program area PA where actual musical information is recorded, and a lead-out area LOA indicating the end of the program area PA, formed thereon in the named order from the inner periphery of the disk, as shown in FIG. 1(a). Those areas LIA, PA and LOA as a whole are called an information area. A signal to be recorded is a digital signal modulated by EFM (Eight to Fourteen Modulation), and includes a main code (main information) such as musical information, and a sub code such as a time code (time information). Index information called TOC (Table Of Contents) is recorded in the lead-in area LIA, and the total number of recorded information pieces (e.g., the total number of musical titles, the total program time (e.g., the total playing time), etc. are recorded as a sub code also in that area LIA. Musical information or the like is recorded as a main code in the program area PA. A track number (TNO) indicating the number of each piece of recorded information (e.g., the music number), the program time (P-TIME) from the beginning of the track, such as the playing time of the music piece, the total program time (A-TIME) measured from the first track number (=1), such as the total playing time, etc. are recorded in the Q channel of the sub code in the program area PA. In the lead-out area LOA is recorded a lead-out code indicating the lead-out area.

In a CD player that plays back the above CD, when the CD is set, a pickup is moved to a predetermined position (home position), a setup operation is then performed to rotate the CD to make it ready for information reading therefrom, and TOC information is read from the lead-in are upon completion of the setup operation. Since the TOC information normally includes the track number of the last piece of recorded information in the program area (LTNO), a playback instruction of recorded information beyond the LTNO, even if given, will not be accepted. In some cases, however, reading the TOC information is rendered impossible, e.g., due to scratches on the disk. If reading of the TOC information is not possible, the LTNO cannot be acquired in advance, so that when an instruction to reproduce the last piece of recorded information is issued, searching for the LTNO is executed.

The operational diagrams illustrating a process in the search for the LTNO are given in FIG. 2(a) to FIG. 2(d). In the search for the LTNO, the target TNO is set to the maximum TNO "99" and searching is conducted radially outward first by means of track jumps. A track-jump (hereinafter referred to as "Tr-jump") is a skip of tracks in reproduction of the disk. The search speed is generally improved by the Tr-jump by skipping over about 100 recorded tracks on a disk at a time. When 99 pieces of information are not recorded, the lead-out area is detected in this search as apparent from (a) in FIG. 2. When the lead-out area is detected, the search is terminated and back 10 Tr jumps (jumps each skipping back ten tracks) are performed until the program area is detected as indicated in (b) in FIG. 2. A 10 Tr jump is such that its jump-over time is equal to or smaller than the predetermined minimum recording time (e.g., 4 seconds) for one piece of information. Therefore, the area in the program area that is detected after the 10 Tr jump is the recording area for the last piece of recorded information, and the TNO indicated by the sub code which is read out from that area is the LTNO. Accordingly, the LTNO is detected and memorized, and the pickup is moved to the head of the information specified by the TNO of the detected LTNO to reproduce the last piece of recorded information, as indicated in (c) in FIG. 2. Thereafter, searching is conducted referring to the memorized LTNO.

The CD player which plays back the above-described CD sequentially reads the recorded information in the program area outward from the inner periphery in normal playback mode. Heretofore, the detection and control of the end of recorded information in the program area (hereinafter called "disk-end") in such playback or fast forward (FF) mode is performed in such a way that the last track-number (LTNO) of the information recorded in the program area is previously acquired from the TOC information and controllably memorized. It is then discriminated as the disk-end:

1. When the lead-out area is detected, or
2. When a track number larger than the LTNO is detected.

FIG. 3 illustrates a flowchart of a routine for determining the disk-end in playback mode in the prior art. During playback, as information is read out, sub codes are sequentially read out. First, the currently acquired sub code is compared with the previously obtained sub code (step S50). If both sub codes equal each other, step S50 is repeated; and if both differ from each other, the current sub code is stored in the memory area of the previous sub code (step S51). Then, it is determined from the sub code information if the pickup has entered the lead-out area (step S52). When the pickup is in the lead-out area, it is discriminated as the disk-end and the routine goes to the subsequent control process of moving the pickup 2 to access the information (disk edge) of the first track number (FTNO) recorded at the innermost track of the program area. When the pickup is not in the lead-out area, on the other hand, the current track number indicated by the sub code is compared with the LTNO (step S53). When the current track number is equal to or smaller than the LTNO, the routine returns to step S50 to repeat the above sequence of processes. When the current track number is larger than the LTNO, it is discriminated as the disk-end and the subsequent process to move the pickup to the disk edge is performed as done after step S52. The conventional CD player discriminates the disk-end in the above manner.

While a CD having the above-described recording format is a read-only recording medium, an additionally recordable CD-R (i.e., a CD on which additional information can be recorded) having the same format as the CDs has been developed recently. This CD-R recording format standard is standardized into a so-called "Orange Book" and conforms to the CD format standard (called a "red book"). The CD-R disks are classified into the following three types as shown in FIG. 1(b) to FIG. 1(d) depending on the recording status of the disk.

FIG. 1(b) shows, in section, a blank or unrecorded disk where no information has yet been recorded.

FIG. 1(c) shows a section of a partially recorded CD-R disk (hereinafter referred to as "PRD") where information is partially written (i.e., the disk has been partially filled with information).

FIG. 1(d) shows a section of a finalized CD-R disk for which recording is complete and which has finally been formatted in nearly the same format as standard prerecorded CDs.

As illustrated in FIG. 1(b) to FIG. 1(d), the lead-in area LIA, program area PA and lead-out area LOA are also formatted on each CD-R in the same manner as that of CDs.

A pregroove is formed on the recording track of a CD-R, and it is wobbled by a frequency that is acquired through FM modulation of a carrier with data indicating the absolute time information (ATIP: Absolute Time In Pregroove). In a CD-R recording and playback apparatus, the tracking control and spindle control are performed according to the pregroove so that information is recorded on and read from a blank disk as well as a PRD. A PMA (Program Memory Area) as a temporary TOC area to store the recording history of recorded information is provided on the PRD at the inner periphery side of an area I that is reserved for the lead-in area LIA as indicated in FIG. 1(c). In this PMA the following three types of information are recorded. The first information includes the start and end addresses of information recorded in the program area, which are recorded in the same format as TOC information that is recorded in the lead-in area. The second type is disk identification information (optional) which may be 6-digit numeral information to identify a disk as needed. The third type is skip command information and skip release information, which are associated with a command to skip the recorded information piece (track) by piece or part of each piece (track) of the recorded information (time designatable in the latter case) at the time of playing back the disk. The reason for recording such information as temporary TOC in the PMA is that since information is writable in the remaining program area PA on the PRD, TOC information cannot be recorded in the lead-in area LIA until the finalization of recording is eventually instructed.

In a PRD, no information is written in an area I for the lead-in area LIA and an area O for the lead-out area LOA. Therefore, those areas remain in a mirror-finished state. When a command for finalization is given, the CD-R recording apparatus records predetermined information and TOC information recorded in the PMA as a sub code in the area I for the lead-in area LIA, and records a predetermined lead-out code indicating the lead-out area LOA in the area O for the lead-out area LOA in order to provide a format analogous to that of standard CDs. This allows conventional CD players to play back the finalized CD-R.

While the conventional CD player is capable of playing back a finalized CD-R, the player is not designed to cope with a PRD, so that it cannot reproduce reproducible information from a PRD even though information is stored in the program area PA. To describe in detail, it is so because of the following reasons. Although a PRD has TOC information recorded in the PMA provided on the inner periphery side of the lead-in area, the conventional CD player is equipped with no mechanism to access that PMA. In addition, the area I for the lead-in area LIA and the area O for the lead-out area LOA remain mirror-finished and the conventional CD player is not designed to perform the proper control on information reading from such areas so that runaway of the servo system may occur in reading information from those areas.

As a solution to this problem, the CD player may be equipped with a mechanism to access the PMA and some means to read the pregroove and perform the tracking and spindle controls, as is found in the CD-R recording and playback apparatus. The provision of such means only for the PRD is not cost effective.

The conventional CD player recognizes the recording end of a disk, which is currently being played back, by detecting the lead-out area during playback or fast forward mode, or detecting a track number (TNO) larger than the last track number (LTNO) indicating the last piece of recorded information based on TOC information previously stored during playback mode (see FIG. 3). After such recognition, the CD player performs repetitive playback or the like, starting from the recording start position of the disk. A CD player having an auto-changer capable of automatically playing back a plurality of disks would generally perform a disk exchange.

Even if the conventional CD player accesses the program area PA of a PRD, it cannot detect the recording end of the disk due to the following reasons. First, the PRD does not have a lead-out area. Secondly, the CD player cannot read information from the PMA and cannot thus acquire the TOC information, so that it is unable to find out the last track number (LTNO) or the total recording time. The above shortcoming is described below more specifically. As shown in FIG. 4, when a defect or an unrecorded area (URA; mirror-finished portion) is detected during playback (or fast forward) mode (see (a) in FIG. 4), the setup operation is performed three times there (see (b) in FIG. 4). If the setup operation is not completed even after the third try, the Tr-jump is performed again to the position corresponding to the defect-detected position after the setup at the home position HP is complete, and then the setup operation is tried again (see (c) in FIG. 4). Accordingly, the above sequence of operations is repeated endlessly. This is because no unrecorded area URA (mirror-finished portion) should be present in the to-be-reproduced area of a CD. As such, the conventional CD player cannot recognize such a mirror-finished URA, and simply sees it as a defective portion, such as a scratch, and functions accordingly. It is to be noted that the home position of a PRD is set within the program area PA. As described above, the conventional CD player involves a first problem in that it is not designed to cope with an unrecorded area URA in playback mode (first problem).

For wider applicability of CD-Rs, a CD player capable of reproducing information from the program area of a PRD through controllable alteration has been developed. In playing back a PRD, however, the conventional CD player cannot access the PMA of the PRD and is thus unable to acquire the TOC information as mentioned above. Thus, the LTNO cannot also be obtained in advance. When an instruction to reproduce the last piece of recorded information from the program area is given, therefore, it is necessary to search for the LTNO. But a lead-out code is not recorded in an area following the information recording area of the program area of the PRD and that area is a mirror-finished area. In the conventional search, therefore, the pickup comes in the mirror-finished portion as indicated in (d) in FIG. 2, which causes the spindle to run away, requiring a further setup, and which prevents the detection of the LTNO (second problem).

In addition, when a PRD is played back by the conventional CD player, TOC information cannot be read so that the last track number LTNO of recorded information cannot be acquired in advance. The LTNO is thus obtained by searching the information. But the searched last track number LTNO may be erroneously identified as smaller than the actual last track number during the searching due to a scratch on the disk, vibration of the disk or the like, and may be memorized as such. In this case, even if there still is some information on and following the track with the memorized track number, the conventional CD player sees that track as the disk-end due to the memorized track number as mentioned earlier, so that recorded information on and following the track with the once memorized LTNO cannot be reproduced. For example, if a PRD actually having 9 pieces of music recorded is identified as having 8 pieces of music due to some circumstance, the CD player views this as the disk-end when detecting the track number of the ninth piece of music information, and cannot play back the ninth piece of music information (third problem).

SUMMARY OF THE INVENTION

It is therefore an object of the first aspect of the present invention to provide a CD player which lo overcomes the first problem and which can thus detect the recording end of a partially recorded CD-R disk during playback or fast forward mode.

To achieve this object, according to the first aspect of the present invention, there is provided a CD player capable of reproducing information from a CD and reproducing recorded information from a program area of a partially recorded CD-R, comprising unrecorded-area detecting means for detecting an unrecorded area of a disk being played back where no information is recorded; address storing means for updating and storing an address of a currently playback position on the disk while playing back the disk, and holding an address immediately before that of the unrecorded area when the unrecorded area is detected; setup operation control means for, when the unrecorded area is detected, performing a setup operation at a position of that detection, and performing a setup operation at a reference setup position if the setup operation at the position of detection has been unsuccessful; playback control means for allowing playback from a position corresponding to the address held by the address storing means when the setup operation at the reference setup position is complete; and recording-end position discriminating means for discriminating the position corresponding to the address held by the address storing means as a recording end position of the disk when the playback from the position corresponding to the address held by the address storing means and detection of the unrecorded area are repeated a predetermined number of times.

According to the first aspect of the present invention, the unrecorded-area detecting means detects an unrecorded area of a disk being played back where no information is recorded, and the address storing means holds an address immediately before that of the unrecorded area when the unrecorded area is detected. The setup operation control means performs a setup operation at the position where the unrecorded area is detected, and performs a setup operation at a reference setup position if the setup operation at the position of that detection has been unsuccessful. Subsequently, the playback control means allows playback from a position corresponding to the address held by the address storing means when the setup operation at the reference setup position is complete. When the playback from the position corresponding to the address held by the address storing means and detection of the unrecorded area are repeated a predetermined number of times, the recording-end position discriminating means discriminates the position corresponding to the address held by the address storing means as the recording end position of the disk.

The recording end position of a PRD can therefore be detected by detecting an unrecorded area without accessing the PMA of the PRD. Further, only when the playback from the position corresponding to the address at which the last playback has been completed and detection of the unrecorded area is repeated a predetermined number of times, is this position discriminated as the recording end position of the disk. Even if an area in the recorded area on the disk is erroneously detected as an unrecorded area due to a scratch on the disk, vibration of the disk or the like, therefore, that area will not be discriminated erroneously as the recording end position.

It is an object of the second aspect of the present invention to provide a recorded information searching method for a CD player, which overcomes the second problem and which can thus search for the last piece of recorded information in the program area on a PRD, i.e., a partially recorded CD-R, during playback of the PRD, thus ensuring efficient reproduction of recorded information from the PRD.

To achieve this object, according to the second aspect of the present invention, there is provided a recorded information searching method for a CD player for moving a pickup through jumps each to skip a predetermined number of tracks to search for the last piece of recorded information in a program area, which method comprises the steps of sequentially storing sub codes read at positions of the jumps; when reading failure occurs in the search, moving the pickup back to a previous jump position to the occurrence of the reading failure; performing a search through a jump over tracks equal to or less in number than the number of tracks of predetermined smallest information from the jump position; and detecting the last piece of recorded information by that sub code read out at a jump position immediately previous to the re-occurrence of reading failure.

If a search is performed for a further piece of recorded information on a PRD area following the program area, the pickup of a CD player enters the mirror-finished portion following the program area, resulting in reading failure. According to the recorded information searching method of the second aspect of the present invention, the sub code read out at a jump position immediately before the occurrence of the reading failure is stored, and the pickup is moved to the position indicated by the stored sub code. Then, searching is conducted from that position while changing the number of tracks to be jumped. As the number of tracks to be jumped is set to a number of recording tracks which does not exceed a predetermined track number corresponding to a minimum information recording time (e.g., 4 seconds), searching is executed without jumping over the smallest possible recorded information amount, and the last piece of recorded information in the program area is detected by the sub code at a jump position immediately before the re-occurrence of reading failure.

It is an object of the third aspect of the present invention to provide a CD player which overcomes the third problem and which is thus designed to update a memorized track number indicating the last piece of information of a partially recorded, additionally recordable CD-R whenever there is information recorded in an area that follows an area corresponding to a previously memorized track number, thereby ensuring playback of all the pieces of recorded information.

To achieve this object, according to the third aspect of the present invention, there is provided a CD player for memorizing a track number indicating the last piece of information and for discriminating the end of a program area by referring to the memorized track number, comprising disk-end updating means for, when detecting a track number indicating a next piece of information in an area following an information recording area corresponding to the memorized track number during playback or fast forward of an additionally recordable disk, updating the track number indicating the last piece of information to the newly detected track number.

When playing back a normal CD, the CD player of the third aspect of the present invention memorizes a track number indicating the last piece of information recorded in the program area based on information recorded in the TOC as done in the prior art. In playback of an additionally recordable disk, such as a partially recorded CD-R, even if the track number indicating the last piece of information is set once through a searching action, the disk-end updating means, when detecting a track number indicating the presence of a further piece of information, which is larger than the indicated final track number, updates the track number indicating the last piece of information to be the newly detected track number.

DETAILED DESCRIPTION OF THE PREFERRED EMBODIMENTS

A preferred embodiment of the first aspect of the present invention will now be described referring to FIGS. 5 through 9.

Figure 1:
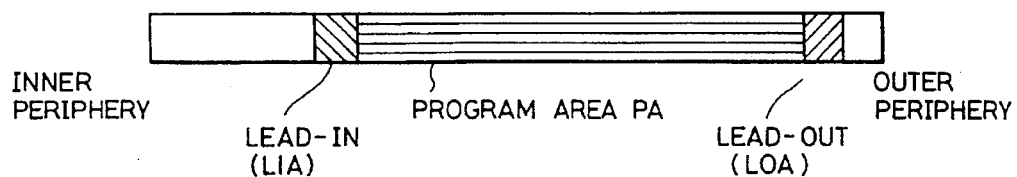
FIGS. 1(a)–1(d) show various CDs in section, for explaining the recording formats of various disks.
Figure 1:
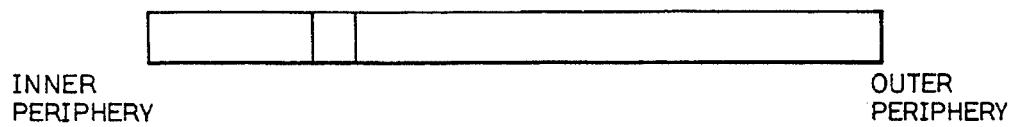
Figure 1:
Figure 1:
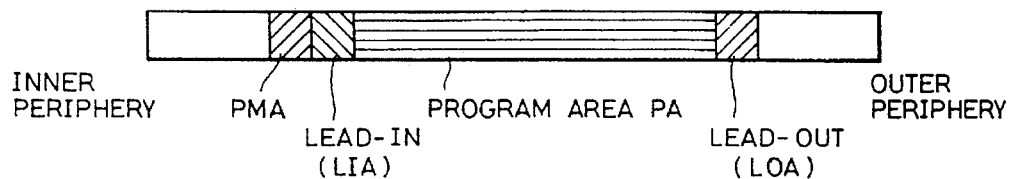
Figure 2:
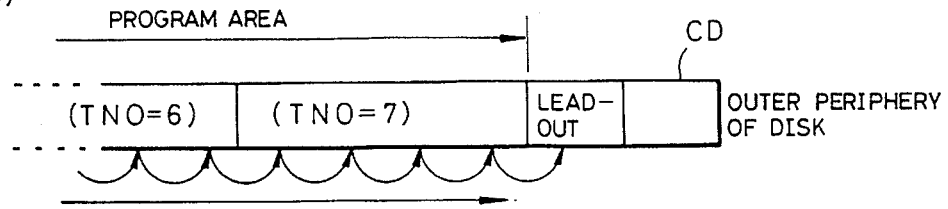
FIGS. 2(a)–2(d) are diagrams for explaining a conventional TNO search process.
Figure 2:
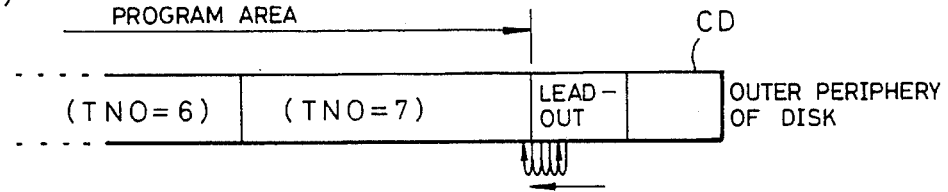
Figure 2:
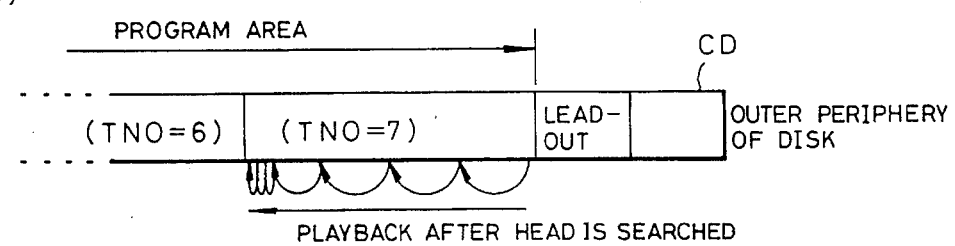
Figure 2:
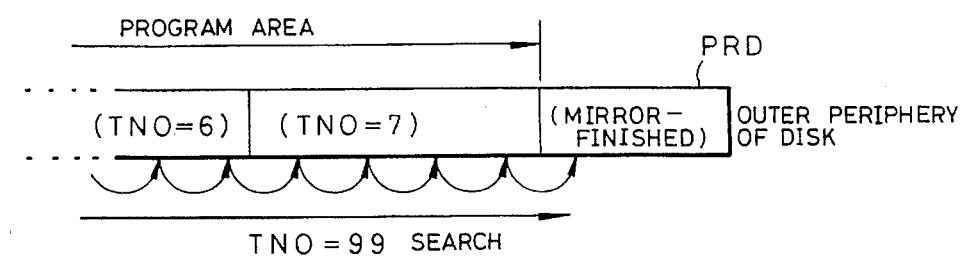
Figure 3:
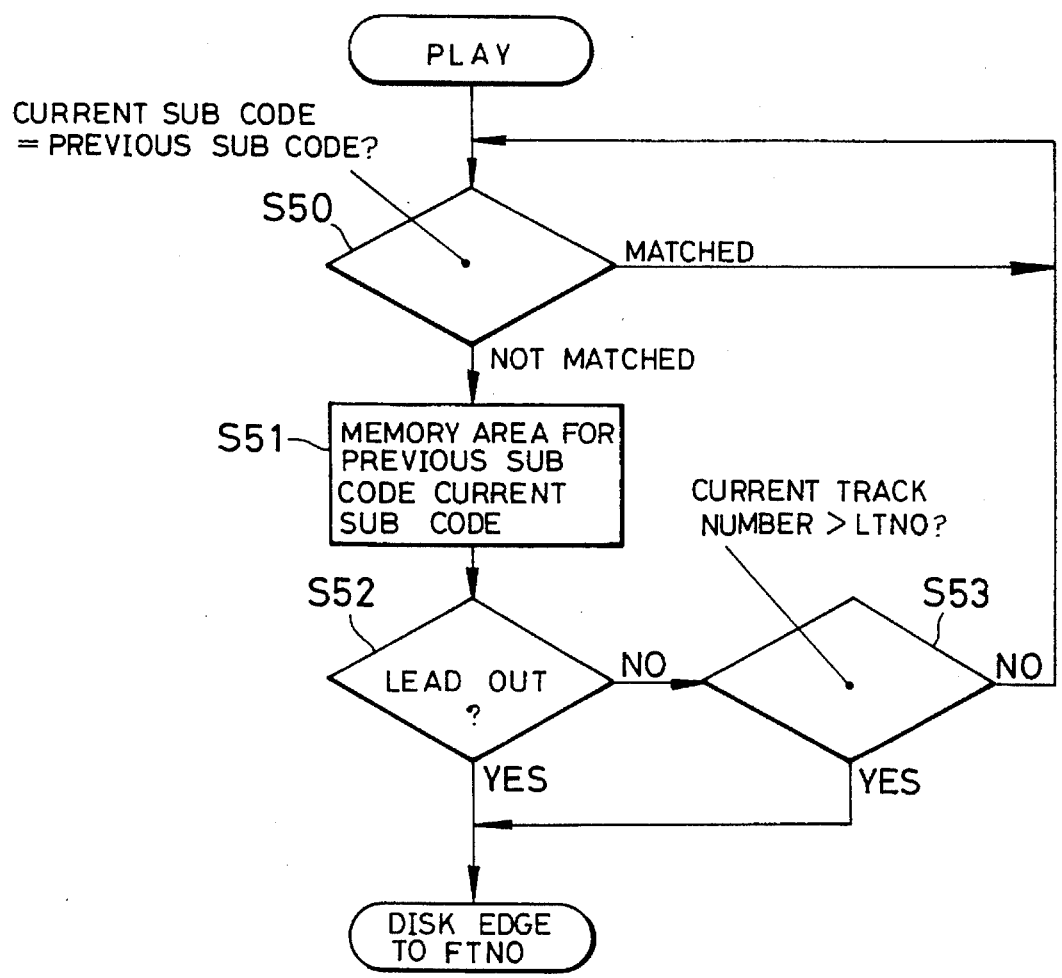
FIG. 3 is a flowchart illustrating a conventional disk-end discriminating process.
Figure 4:
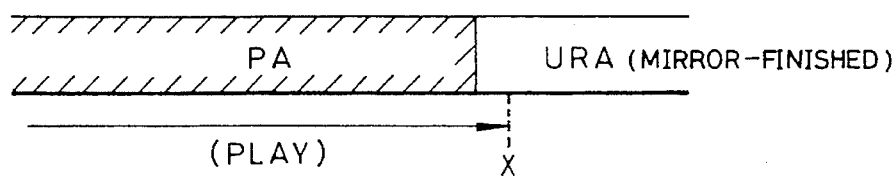
FIGS. 4(a)–4(c) are diagrams illustrating the operation in the conventional CD player.
Figure 4:
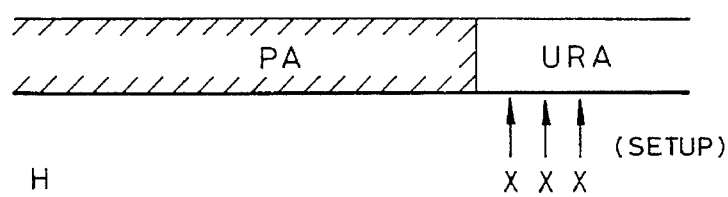
Figure 4:
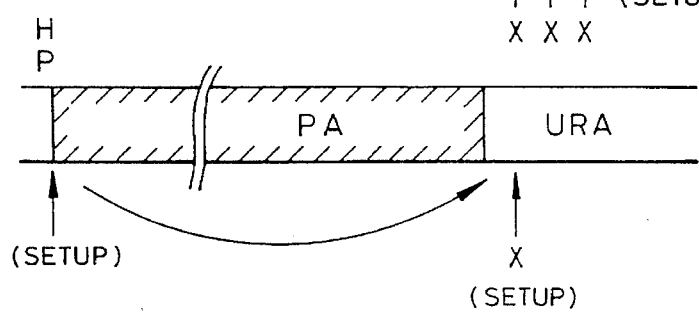
Figure 5:
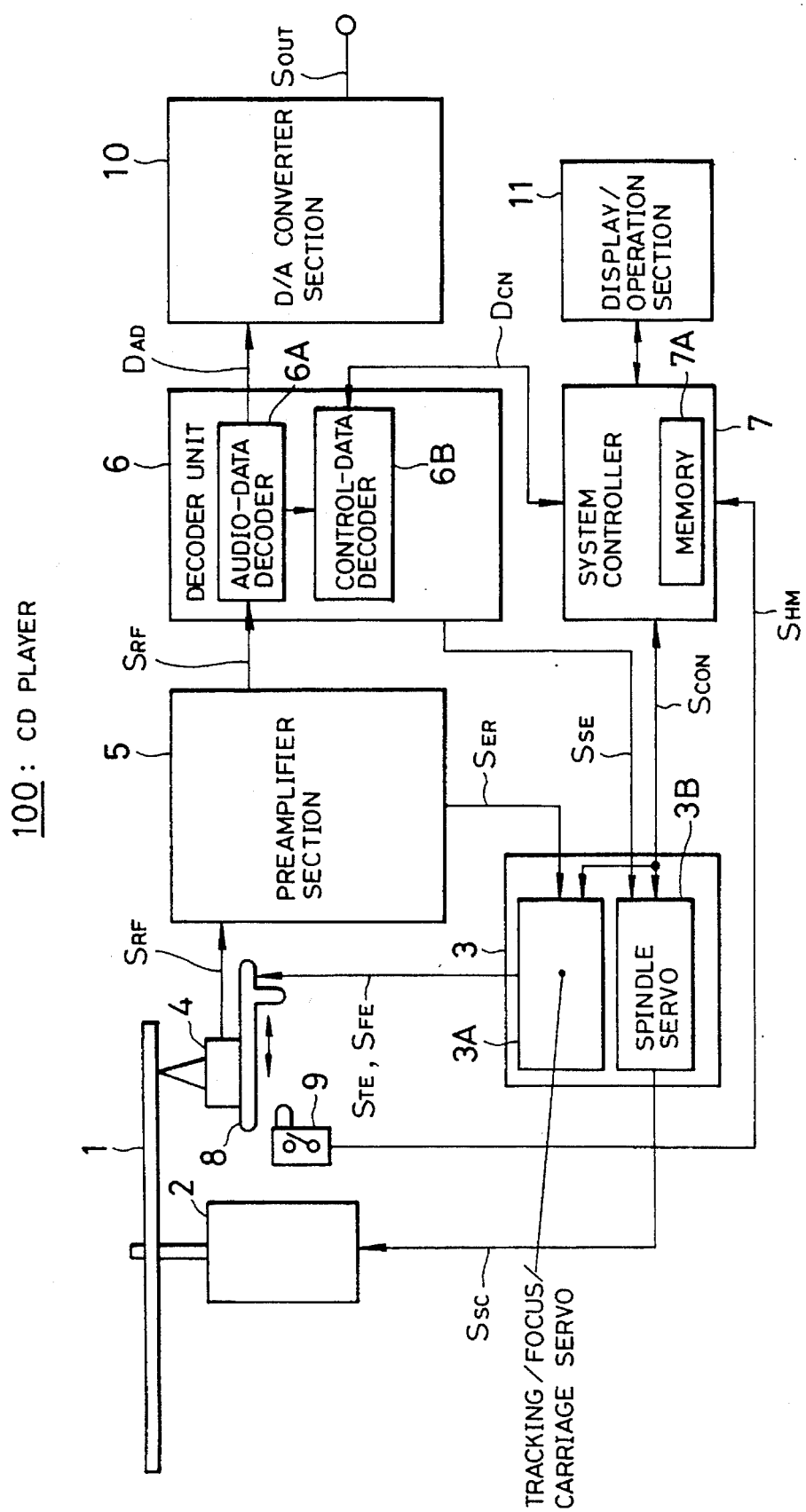
FIG. 5 is a block diagram illustrating the basic structure of a CD player embodying the present invention.

FIG. 5 presents a block diagram showing the basic structure of a CD player to which the present invention is applied.

A CD (or partially recorded or a finalized CD-R) 1 to be played back is placed on a turntable (not shown) of a CD player 100. A spindle motor 2 rotates the CD 1 based on a spindle servo control signal $S_{SC}$ from a servo unit 3. A pickup 4 reads recorded data on the CD 1 and outputs it as a playback RF signal $S_{RF}$ to a preamplifier section 5. The preamplifier section 5 amplifies the playback RF signal $S_{RF}$, and outputs the amplified signal to a decoder unit 6. The preamplifier section 5 also produces an error signal $S_{ER}$ from the playback RF signal $S_{RF}$ and outputs it to the servo unit 3. The servo unit 3 includes a first servo section 3A and a second servo section 3B. The first servo section 3A produces a tracking error signal $S_{TE}$ and a focusing error signal $S_{FE}$ from the error signal $S_{ER}$ and a control signal $S_{CON}$ from a system controller 7 to execute tracking servo and focusing servo for the pickup 4. The first servo section 3A also performs carriage servo to drive a carriage 8 based on the control signal $S_{CON}$ from the system controller 7 and the error signal $S_{ER}$ from the preamplifier section 5. Near the carriage 8 is provided a home position detection switch 9, which detects the home position of the carriage 8 and outputs a home position detection signal $S_{HM}$ to the system controller 7. The decoder unit 6 includes an audio-data decoding section 6A and a control-data decoding section 6B. The audio-data decoding section 6A converts the received playback RF signal $S_{RF}$ into a binary signal, separates a frame sync pattern therefrom, demodulates the signal based on the EFM (Eight to Fourteen Modulation), performs signal processing, such as error correction, on the resultant signal, and outputs audio data $D_{AD}$ to a D/A converter section 10. The audio-data decoding section 6A also outputs control data $D_{CN}$ included in a sub code to the control-data decoding section 6B. The decoding section 6B decodes the control data $D_{CN}$ and outputs the resultant data to the system controller 7. At the same time, the decoder unit 6 produces a spindle servo error signal $S_{SE}$ from the input playback RF signal $S_{RF}$ and outputs it to the second servo section 3B. The second servo section 3B serves as a spindle servo section. Based on the spindle servo error signal $S_{SE}$ and control signal $S_{CON}$, the second servo section 3B outputs the spindle servo control signal $S_{SC}$ to the spindle motor 2 to rotate the spindle motor 2 at a predetermined speed. The D/A converter section 10 converts the input audio data $D_{AD}$ into an analog signal and outputs it as an audio output signal $S_{OUT}$. The system controller 7 performs the general control of the CD player 100 based on the control data $D_{CN}$ and an operation control signal from a display/operation section 11. The system controller 7 has a memory 7A memorizing various data. The display/operation section 11 is equipped with a display section (not shown) to display various types of information and inform a user of such information, and performs various displays under the control of the system controller 7.

Before the operational description of this embodiment, the setup operation will be described.

1) Move Pickup to Initial Position

In the setup operation, first, the pickup is moved to the initial position. For instance, if the home position is set so that the beam spot position is about 24 mm in radius from the center of the CD 1, the system controller 7 controls the first servo section 3A and drives the carriage 8 to move the pickup 4 toward the inner periphery of the CD 1. As a result, the carriage 8 is moved to the position (initial position) where the beam spot from the pickup 4 comes closer to the center of the CD 1 than the predetermined home position (about 24 mm in radius). The carriage 8 is moved by radial servo that sets the relative speed of the beam spot to the recording track in the radial direction constant. However, focus servo has not been applied yet in the above carriage movement, so that the relative speed cannot be detected and the carriage is moved at the maximum speed allowable by a carriage motor (not shown). But the carriage 8 is controlled to move for a short period of time and then be braked immediately thereafter, to repeat this intermittent movement until it reaches the initial position.

2) Move Pickup to Activation Position

Next, the pickup 4 is moved to the activation position. This movement is done by moving the carriage 8 in the same manner as the movement to the initial position but toward the outer periphery of the CD 1 this time. It is detected that the pickup 4 has reached the activation position when the home position detection switch 9 is turned off, and then the movement to the activation position is terminated. Accordingly, the activation position comes slightly outward of the home position.

3) Activate Semiconductor Laser

When the pickup 4 reaches the activation position, the system controller 7 activates a semiconductor laser (not shown) in the pickup 4 and waits for the laser to be stable.

4) Activate Focus Servo

When the semiconductor laser becomes stable, the system controller 7 activates the focus servo.

5) Rotate Disk

Then, the system controller 7 feeds a large constant current to the spindle motor 2 via the second servo section 3B of the servo unit 3 and accelerates the rotation of the CD 1 to about 500 rpm nearly equal to the rotational speed involved in accessing the inner periphery side of the CD 1.

6) Examine pull-in of Focus Servo

Next, the system controller 7 examines if the focus servo has been pulled in.

7) Activate Tracking Servo

When a completion of the pull-in of the focus servo is detected, the system controller 7 activates the tracking servo and carriage servo, and then examines if both servos have completed pull-in.

8) Activate Sync Servo

After the tracking servo and carriage servo have been completely pulled in, the system controller 7 switches the spindle servo to sync servo, which thereafter controls the spindle motor 2 to make the rotating CD 1 have nearly the correct linear speed.

9) Lock PLL

Immediately after the sync servo is activated, the speed of the spindle motor 2 may not be the correct linear speed. Thus, the system controller 7 detects the frame sync in the reproduced signal, and performs control based on the frame sync so that the speed of the spindle motor 2 comes within a range of several percent of the correct linear speed, and the PLL is locked in.

The setup operation is terminated after the above steps 1) to 9) are executed, and the CD player goes to the normal playback operation. The above sequence of steps is just one example of the setup operation, and is in no way restrictive. The above setup operation is for a normal CD; to play back a PRD, it is necessary to set a home position in the program area PA of the PRD.

Figure 6:
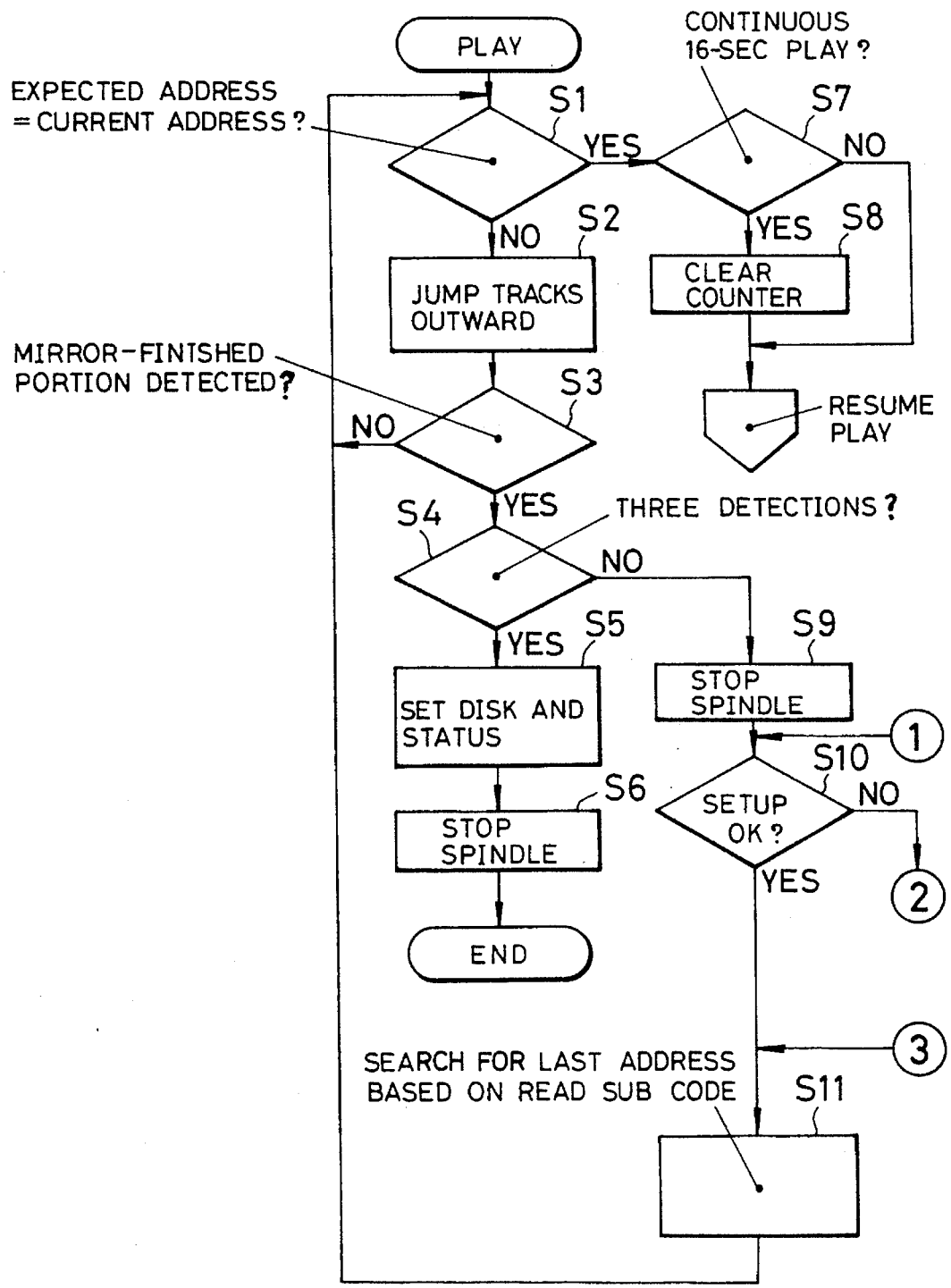
FIG. 6 is a flowchart (part 1) illustrating the operation of a first embodiment of the first aspect of the present invention.
Figure 7:
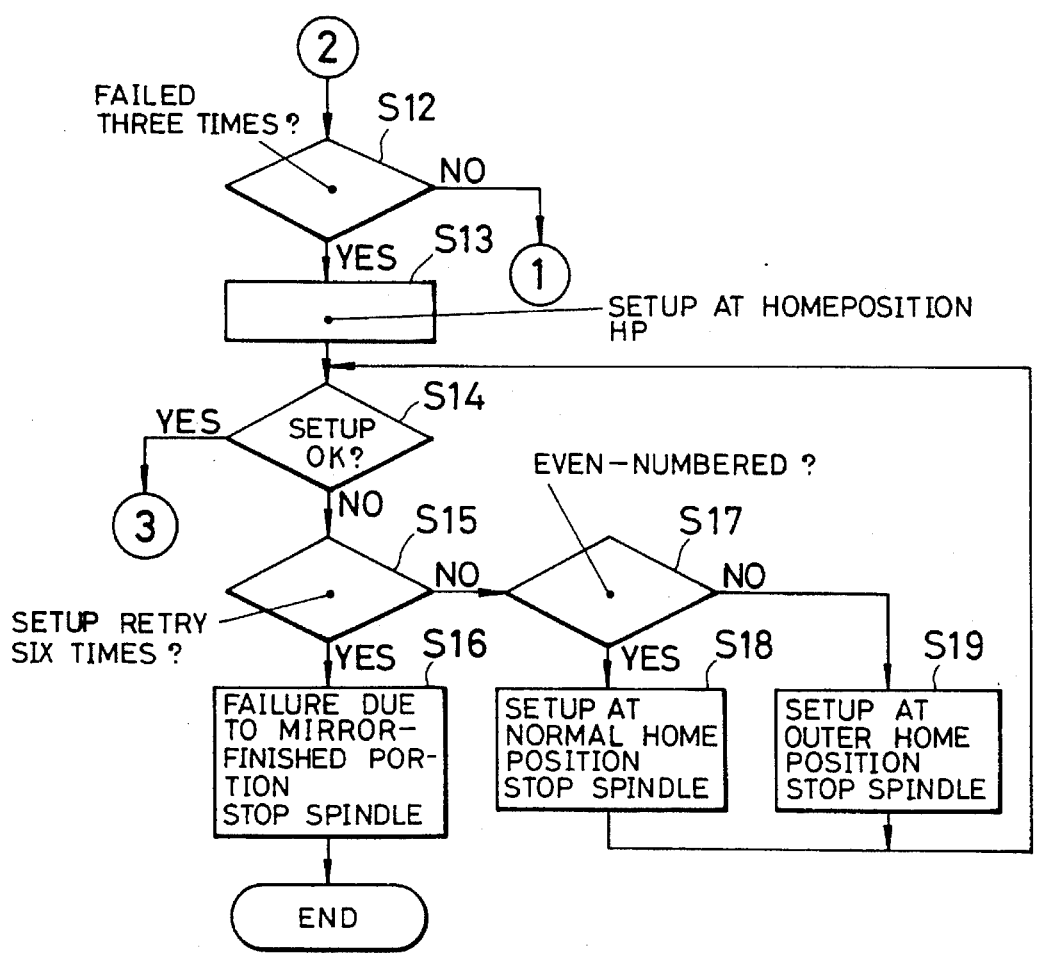
FIG. 7 is a flowchart (part 2) illustrating the operation of the first embodiment of the first aspect of the present invention.
Figure 8:
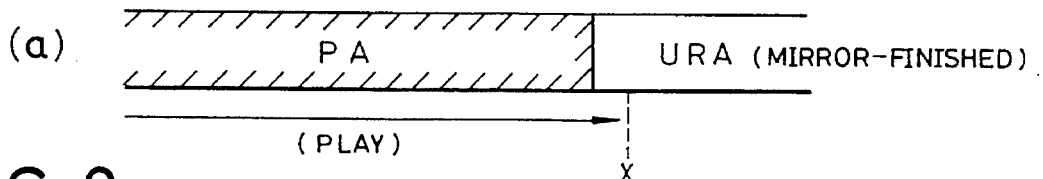
FIG. 8 is a diagram (part 1) for explaining the operation of the first embodiment of the first aspect of the present invention.
Figure 8:
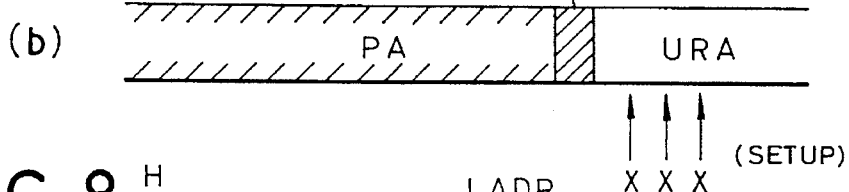
Figure 8:
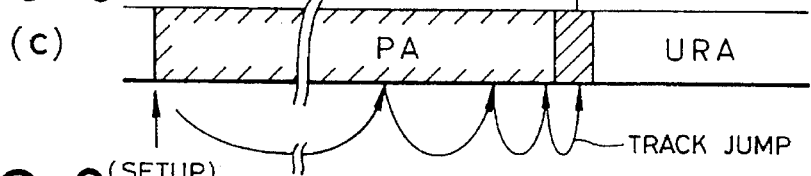
Figure 8:
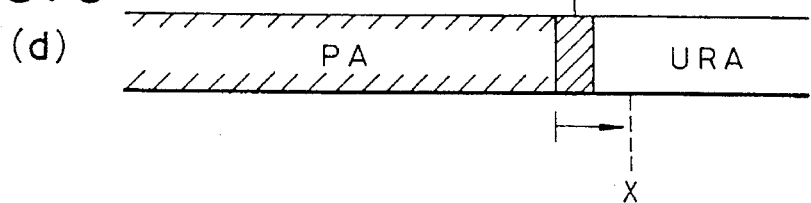

A process of detecting the recording end position will be described referring to operational flowcharts given in FIGS. 6 and 7 and exemplary operational diagrams given in FIGS. 8 and 9. In this case, it is assumed that a PRD is placed on the turntable, playback or fast forward (FF) of the program area PA is in progress after completion of the setup operation at the home position, and the system controller 7 is sequentially producing and holding the total or accumulative recording time (A-TIME) measured from the first track with the track number=1 in the sub code, which should be acquired if the playback or fast forward is being carried out properly, as an expected address. It is also assumed that during the proper playback, the accumulative recording time (A-TIME) measured from the first track with the track number=1 in the sub code which is included in an actual reproduced signal is updated and held as a current address. It is to be noted that the memory 7A of the system controller 7 is provided with an area for a counter used to check the number of times a mirror-finished portion is detected, an area for holding the expected address, and an area for holding the last address. The initial value for the count of the counter is "0".

When Recording End is Reached

First, the system controller 7 determines if the currently held expected address matches with the current address, i.e., whether or not playback is properly progressing (step S1).

When the expected address matches with the current address, it is determined if the playback mode is performed continuously for 16 seconds or longer (step S7). When the playback mode continues for 16 seconds or longer, the counter is reset (step S8) and the playback mode is resumed. If the playback mode is not performed continuously for 16 seconds or longer, playback is simply resumed without resetting the counter.

When the expected address is not equal to the current address, the Tr-jump is made outward to a position on the disk corresponding to the expected address (step S2). Then, it is determined if the pickup 4 enters an unrecorded area URA as shown in (a) in FIG. 8 to detect a mirror-finished portion (step S3). When no mirror-finished portion is detected, the routine goes back to step S1.

When a mirror-finished portion is detected in step S3, the value of the counter is incremented and it is then determined if a mirror-finished portion has been detected three times, i.e., if the value of the counter equals "3" (step S4).

In this case, it is the first detection (count=1) and the destination of the jump is a mirror-finished portion, disabling the reading of a sub code, so the spindle motor 2 is stopped (step S9). At this time, before stopping the spindle motor 2, the latest updated current address has been stored as a last address in the memory 7A. Then, a setup operation is performed at that position. It is then determined if the setup operation has been successful (step S10). If the setup operation has been unsuccessful, it is discriminated if the setup operation has been unsuccessful three consecutive times based on the value of the counter (step S12). When the setup operation has been unsuccessful three times at that position (see FIG. 8(b)), the pickup 4 is moved to the home position HP as indicated in FIG. 8(c) and a setup operation is tried there (step S13). It is then checked if the setup operation at the home position HP has been successful (step S14).

When the setup operation at the home position HP has been successful as indicated in FIG. 8(c), the Tr-jump is made to a position LADR equivalent to the last address (see step S11). Playback starts from this position LADR, and the sequence of steps S1 to S4 is repeated. Also, in this case, as it is the second detection of a mirror-finished portion in step S4, a sequence of processes starting with step S9 is also executed.

When the number of times a mirror-finished portion is detected becomes three (count=3), the process jumps from step S4 to step S5 for the first time, and it is discriminated that the recording end has been reached (step S5), and the spindle motor 2 is stopped (step S6) before terminating the routine.

If it is found that the setup operation at the home position HP has been unsuccessful in step S14, it is checked if the setup retry has already been done six times (step S15). As no setup retry has been done yet in this case, the process goes to the setup retry routine (steps S17–S19). If the setup retry has already been done six times, on the other hand, it is considered that the setup is not possible and the operation will be terminated (step S16).

In this setup retry routine, it is determined how many times the retry has been done. If it is an even-numbered retry, the setup operation is performed at the normal home position HP (step S18); but if is an odd-numbered retry, on the other hand, the setup operation is performed at an outer home position set outward of the normal home position HP (step S19). It is checked again if the setup operation has been successful (step S14). When the setup has not been carried out properly, a sequence of processes of steps S15, S17 and S18 or S19 is likewise executed to perform the setup operation until the sixth setup retry is conducted. In the setup retry routine, therefore, the setup operation at the normal home position HP and the setup operation at the outer home position are executed alternately, three times at the normal home position HP and three times at the outer home position at a maximum. When any setup operation has been unsuccessful, the setup is considered disabled and the spindle motor 8 is stopped (step S16). Thus, the operation will be terminated.

Figure 9A:
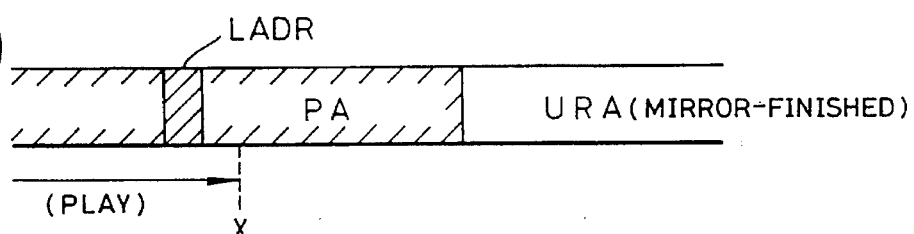
FIG. 9 is a diagram (part 2) for explaining the operation of the first embodiment of the first aspect of the present invention.
Figure 9B:
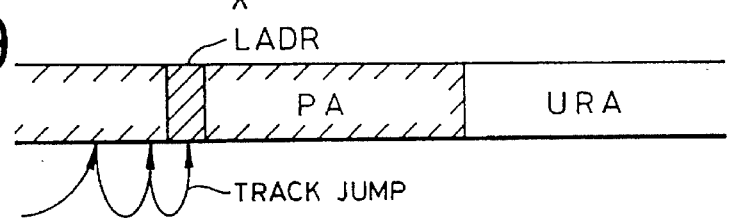
Figure 9C:
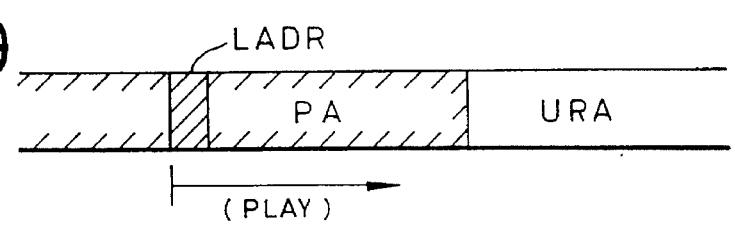

When Expected Address Does Not Match With Current Address At Other Portion Than Recording End When the expected address does not match with the current address at some other portion other than the recording end as indicated in FIG. 9(a), due to the vibration of the disk or scratches thereon, and if, after performing steps S1 and step S2, a setup operation is performed at the position, the setup operation at that position is possible. As a result, the current position is discriminated not to belong to a mirror-finished portion in step S3, and the process goes back to step S1. Since the expected address should match with the current address this time, the process goes to step S7. As playback should continue for 16 seconds or longer this time, the counter is reset (step S8) and the playback is resumed.

Although the number of setup retries is set to six times in the above embodiment, it is possible to conduct a setup retry for any arbitrary number of times equal to or greater than two. While the time for the continuous playback is 16 seconds or longer in step S7, the time is not limited to this value but may be set to any value long enough to distinguish an unrecorded area URA from a real defective portion (such as scratch or vibration of the disk). Further, although the number of setup retries for an unrecorded area is set to three times, any given number is acceptable. In short, according to the first aspect of the present invention, when the playback from the position corresponding to the address held by the address storing means and detection of an unrecorded area are repeated a predetermined number of times, the recording-end position discriminating means discriminates the position corresponding to the address held by the address storing means as the recording end position of the disk.

Therefore, the recording end position of a PRD can be detected by detecting an unrecorded area without accessing the PMA of the PRD. It is thus possible to perform repetitive playback of a PRD or switch one disk from another in an auto-changer or the like as easily as is done for a normal CD. Further, only when the playback from the position corresponding to the address at which the last playback was performed and detection of the unrecorded area is repeated a predetermined number of times, is this position discriminated as the recording end position of the disk. Even if an area in the recorded area on the disk is erroneously detected as an unrecorded area due to a scratch on the disk or vibration of the disk, therefore, that area will not be discriminated erroneously as the recording end position.

A preferred embodiment of the second aspect of the present invention will be described below.

Referring to FIG. 5, when the disk 1 is set, the system controller 7 first drives the carriage 8 as a servo mechanism via the servo unit 3 to move the pickup 4 to the home position set near the innermost portion of the program area to conduct a setup. In the setup, the system controller 7 drives the spindle motor 2 and sequentially activates the individual servos, making the CD player ready for information reproduction. If there is a scratch or the like at that position on the disk 1 which corresponds to the home position, or the home position comes on the mirror-finished portion of the PRD, the setup may not be carried out. In this case, the pickup 4 is moved outward of the home position and the setup is tried again, thus controlling to reproduce the information at the innermost portion of the program area.

When the setup is complete, a process to read TOC information is performed next. It is discriminated whether the disk is "normal CD with TOC," "normal CD without TOC" or "PRD" that is a partially recorded disk belonging to additionally recordable CD-Rs, based on the result of reading the TOC information, and information on the discrimination result is stored as disk discrimination information. Thereafter, when playback is instructed from the display/operation section 11, reproduction of the recorded information in the program area is controlled according to the disk discrimination information.

When the target disk 1 is discriminated as a "PRD" "99" is set and memorized as a LTNO indicating the last piece of recorded information. When receiving an instruction to reproduce the last piece of recorded information from the display/operation section 11, the system controller 7 starts searching for the LTNO=99. The search is generally conducted by making a 100-Tr-jump.

Referring to FIG. 10, a description will now be given of a search for the last piece of recorded information in the program area according to this embodiment.

(1) In search for the program area of a PRD outward, first, sub codes read out at jump positions are sequentially stored. Then, when the pickup 4 enters a mirror-finished portion and reading failure occurs at the jump position as indicated in (a) in FIG. 10, the search is interrupted and the spindle motor 2 is stopped while the sub code including the stored address of a previous jump position to the position of occurrence of the reading failure is stored.

(2) Next, the pickup 4 is moved back inward from the position where the reading failure has occurred, as indicated in (b) in FIG. 10. The pickup 4 is moved by a given amount that depends on the home position and the amount of a jump.

(3) Then, a setup is performed at the position to which the pickup 4 has been shifted inward. When the setup is unsuccessful, the home position is located again or the pickup 4 is moved further inward by a given period of time, which is repeated until the setup is complete.

(4) When the setup is complete, searching is conducted outward with the stored address (M) for the jump position immediately prior to the position of occurrence of the reading failure as a temporary target, as indicated in (c) in FIG. 10. The search is conducted through a jump in such a way that the pickup 4 does not stop at a position outside the position of the address (M) while comparing the current position with the position (M).

(5) When the position (M) is searched, searching is resumed outward from that position by a 10-Tr-jump, which skips tracks less in number than the number of recording tracks corresponding to program of minimum allowable duration, if recorded on the disk, as indicated in (c) in FIG. 10. In this searching too, the sub codes read at the addresses of the individual jump positions are sequentially stored.

(6) When the pickup 4 enters a mirror-finished position, resulting again in reading failure, while performing the 10-Tr-jumps, the information in the recording area indicated by the TNO included in the sub code (C) that has been read at the jump position immediately previous to the position of the occurrence of the reading failure is determined as the last piece of recorded information in the program area and this TNO is stored as the LTNO. Then, a search for the head of the recording area specified by the LTNO is conducted and the information is reproduced as the last piece of recorded information. Thereafter, searching for the last piece of recorded information is executed with that stored LTNO.

Figure 10A:
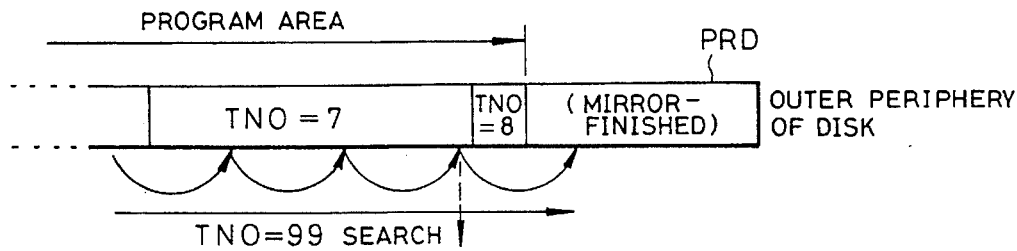
FIG. 10 is a diagram for explaining a search for the last piece of recorded information on a PRD according to an embodiment of the second aspect of the present invention.
Figure 10B:
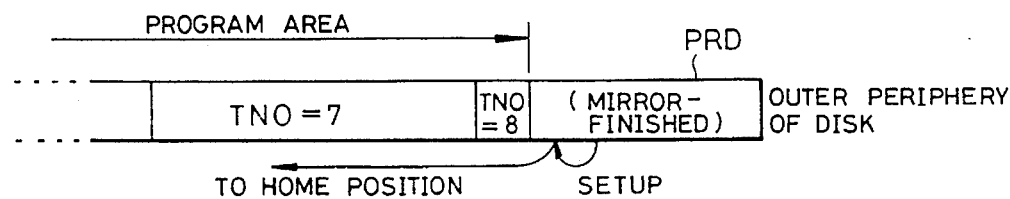
Figure 10C:
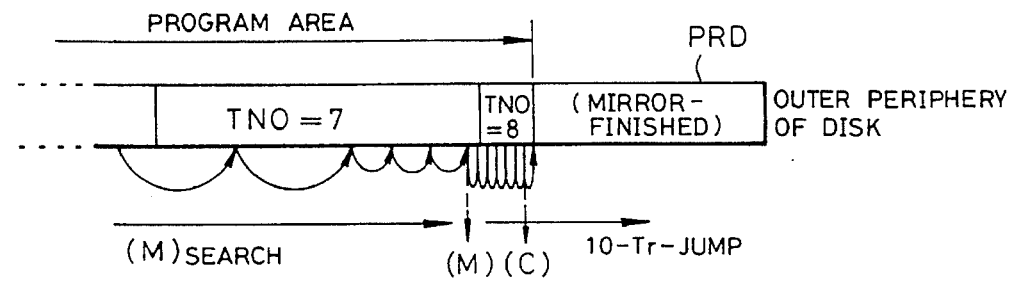
Figure 10D:
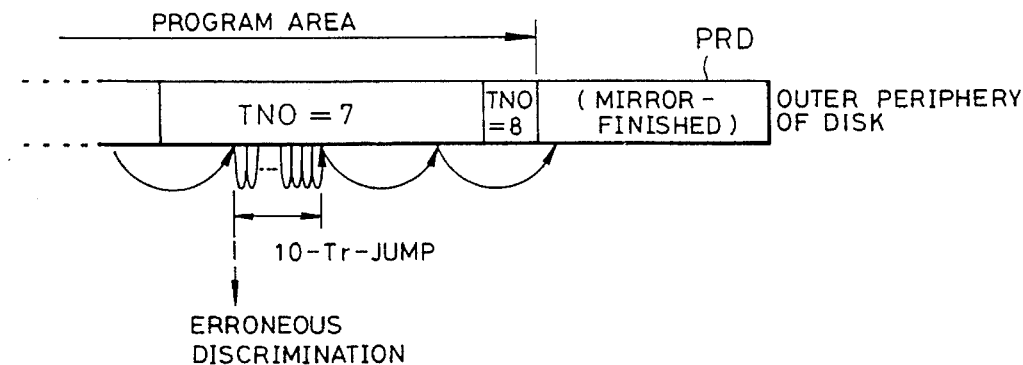

(7) The number of jumps in the 10-Tr-jump search is counted, and if no reading failure occurs after thirty jumps, the previous reading failure is considered as originating from a scratch on the disk, disk vibration or the like. Then, as indicated in FIG. 10(d), the 10 Tr jump search is interrupted, and the normal searching is executed again from that position.

Figure 11:
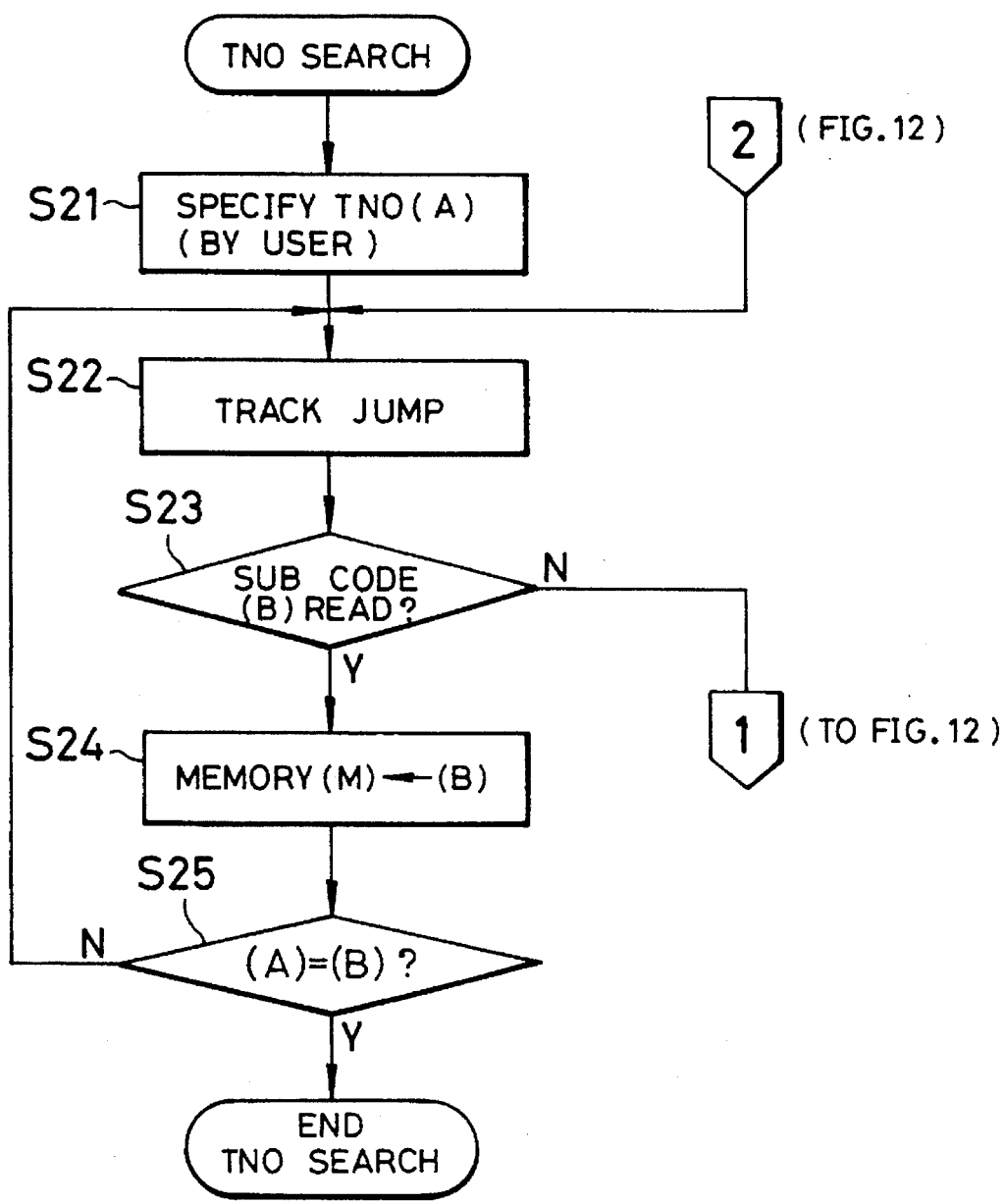
FIG. 11 is a flowchart (part 1) of a TNO search routine according to one embodiment of the second aspect of the present invention.

Referring now to the flowcharts given in FIGS. 11 and 12, a detailed description will be given of the process of the system controller 7 which controls the above-described search. First, the TNO specified by a playback instruction given from the display/operation section 11 is set as a target (A) (step S21). In this case, when playback of the last piece of recorded information is designated, the stored LTNO is taken as the target TNO (A); however, when the disk is a PRD, "99" is set for the LTNO Next, the system controller 7 controls the servo unit 3 to start the search through the Tr-jump (step S22). The Tr-jump in this search is set to perform large jumps, to skip about 100 tracks each. Then, a sub code at each jump position is read out. If it can be read out properly, the sub code (B) is stored in the memory (M), and the TNO (B) specified by the sub code is compared with the target TNO (A) (steps S23, S24 and S25). If these track numbers do not match with each other, the flow returns to step S22 to make the next Tr jump. When the track numbers do match with each other, the search is terminated, and the head of the recording area specified by the TNO is then searched to play back the recorded information.

Figure 12:
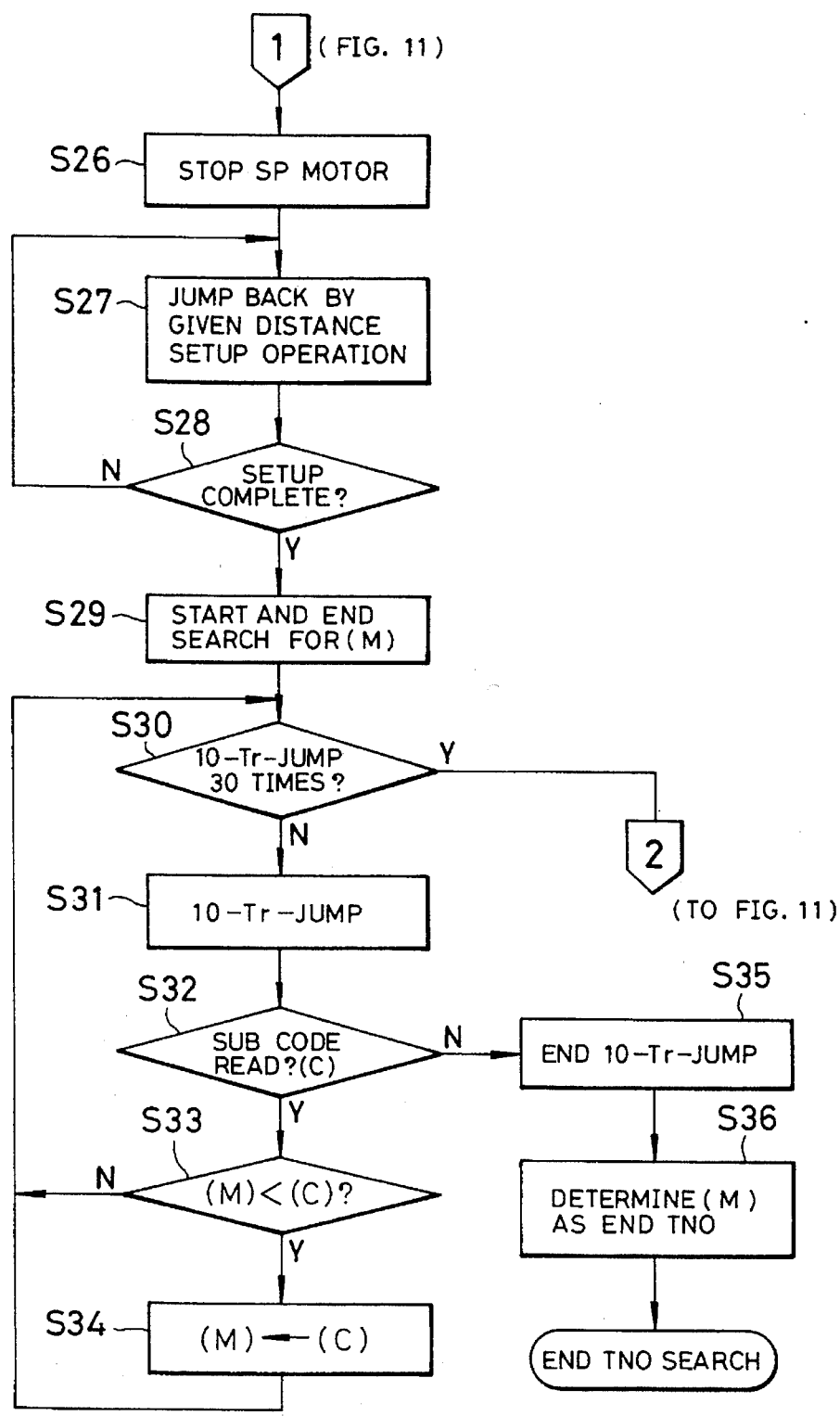
FIG. 12 is a flowchart (part 2) of the TNO search routine, which follows FIG. 11.

If it is found that a sub code cannot be properly read out at the jump position in step S23, this event is considered as the occurrence of reading failure and the spindle motor 2 is controlled to stop (step S26 in FIG. 12). The servo unit 3 is then controlled to make a backward jump for a given distance and a setup operation is tried there. If the setup operation is not possible, the pickup 4 is moved back further, and a setup operation is tried again (steps S27 and S28). This sequence of processes is repeated until the setup operation is complete. In the backward jump, the pickup 4 may be returned to the home position. When the setup operation is completed, a search is conducted while taking the position indicated by the sub code at the jump position previous to the position of occurrence of the reading failure, the address of which is still stored in the memory (M), as a temporary target (step S29). This search is so controlled as not to skip the temporary target. When the position of the temporary target is reached, a search using 10-Tr-jumps starts from that position, the number of the jumps is counted, and it is then checked if the count exceeds "30" (step S30). If the count exceeds "30" it is considered that the reading failure has originated from some scratches on the disk, or from disk vibration or the like, and the process returns to step S22 to resume the search for the first target through a large jump. If the count is less than "30" in step S30, on the other hand, the process advances to step S31 to try a 10-Tr-jump.

In each 10-Tr-jump, like a large jump, a sub code at the jump position is read; if the sub code is read properly, that sub code (C) is compared with the sub code (M) in the memory; when the address of the currently read sub code is larger than that of the stored sub code, the latter sub code in the memory is replaced with the former one before repeating a 10-Tr-jump (steps S32, S33 and S34).

When the sub code at the destination of the 10-Tr-jump is not properly read in step S32, the reading failure is determined as having originated from a mirror-finished portion, the 10-Tr-jump is terminated, and the TNO specified by the sub code at the jump position previous to the occurrence of the reading failure, stored in the memory, is determined and stored as the LTNO (End TNO) (steps S35 and S36). This completes the searching, after which a setup operation is performed, the head of the recording area of the LTNO is searched, and playback is then performed. Although the number of conducted 10-Tr-jumps that is checked in step S30 is set to "30" this number is determined so that the number of tracks jumped by 10-Tr-jumps does not exceed the number of tracks jumped by a large jump in a search, and is not restrictive in any way.

As described above, according to this embodiment, even if reading failure of a sub code occurs due to the pickup positioned at a mirror-finished portion of a PRD, the pickup is moved back to the position of the sub code read immediately before the occurrence of reading failure, searching is resumed from that position by 10-Tr-jump increments, skipping tracks less in number than the number of recording tracks corresponding to a smallest possible program, and the sub code registered immediately before the re-occurrence of reading failure is memorized. As indicated in (c) in FIG. 10, therefore, the last piece of recorded information (TNO=8) in the program area can be assuredly detected. Further, even if the reading failure originates from some scratches on the disk or the disk vibration, this even will not be erroneously discriminated as caused by a mirror-finished portion by controlling the number of 10-Tr-jumps that should be conducted.

In short, the recorded information searching method for a CD player according to the second aspect of the present invention can search, without problems, for the last piece of recorded information in the program area even if a partially recorded type of CD-R (i.e., PRD) whose TOC information cannot be read and whose area following the program area is a mirror-finished portion. Quick playback is therefore possible in a later search, thus ensuring efficient playback of a PRD.

An embodiment of the third aspect of the present invention will be described below.

Referring to FIG. 5, when the disk 1 is a read only type CD, the system controller 7 controllably accesses the lead-in area, obtains TOC information via the decoder unit 6, and then stores that information in the memory. The system controller 7 stores the track number LTNO indicating the last piece of information recorded in the program area based on that TOC information, as per the conventional CD player. When the disk 1 is a PRD, which is a partially recorded type of CD-R, TOC information cannot be obtained. In this case, the LTNO indicating the last piece of information in the program area is acquired in such a way that when an access instruction is given from the display/operation section 11, the last piece of information in the program area is searched and the sub code of that information is stored in the memory, taking the track number of that information as the LTNO. The end of the program area is discriminated by the presence of a mirror-finished portion. After the sub code is stored, the disk-end updating means compares the track number indicated by a sub code of currently reproduced information with the LTNO during playback or fast forward, and updates the LTNO when detecting any sub code that indicates a track number larger than the LTNO.

Figure 13:
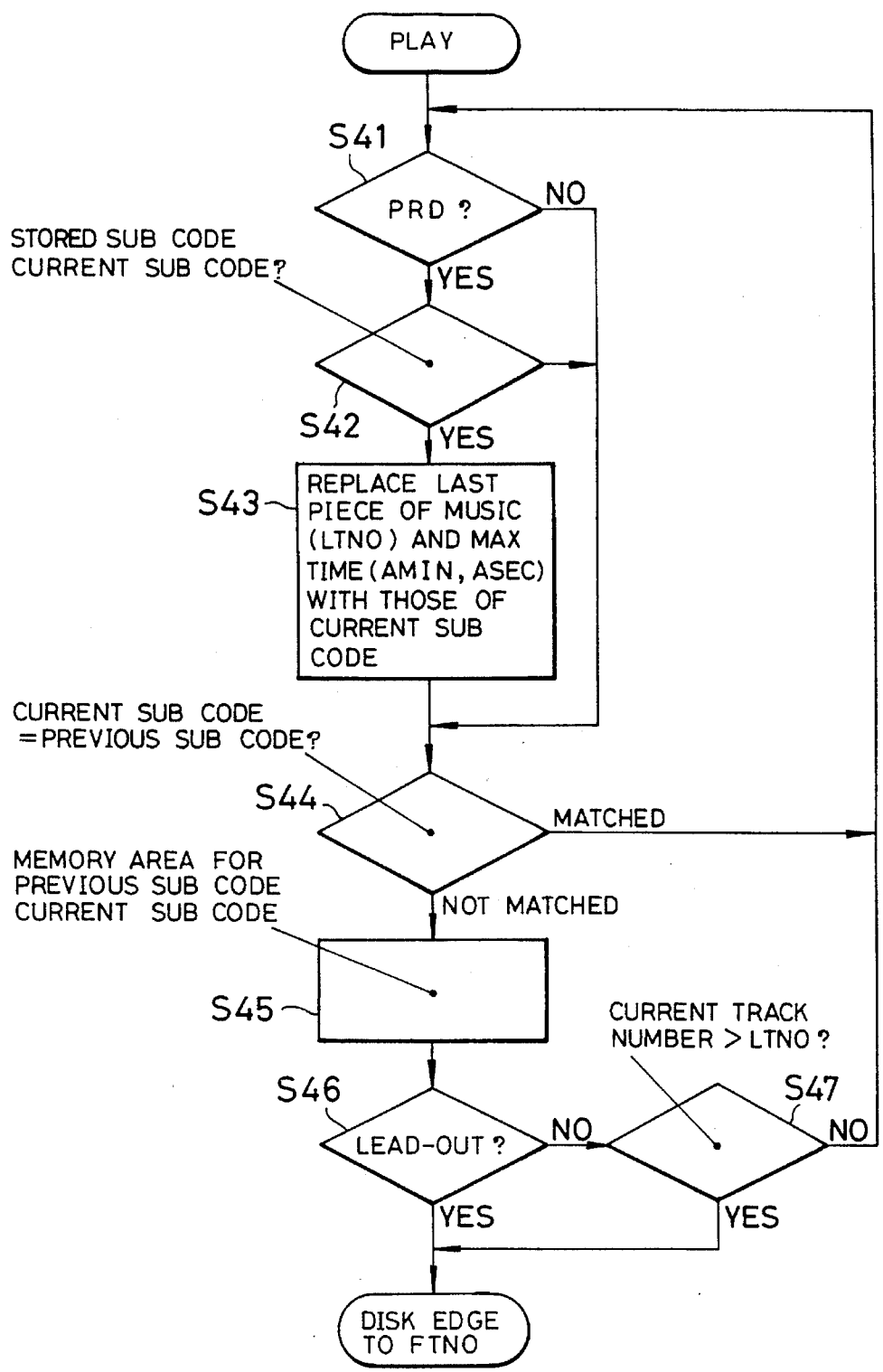
FIG. 13 illustrates an operational flowchart of disk-end updating means according to one embodiment of the third aspect of the present invention.

FIG. 13 illustrates a flowchart of a process that is executed by the system controller 7 as the disk-end updating means during playback.

Referring to this flowchart, the process of the disk-end updating means will be described. First, it is determined if the disk to be played back is a PRD (step S41). When it is not a PRD, the flow advances to step S44 to perform the same processing as done conventionally. If the disk is a PRD, the system controller 7 obtains the sub code of the information currently being read, via the decoder unit 6, compares the track number indicated by this sub code with the LTNO in the stored sub code that has been set as that of the last piece of information, and determines if the former track number is greater than the LTNO (step S42). When it is not larger than the LTNO, the system controller 7 goes to step S44. If the former track number is equal to or larger than the LTNO, the system controller 7 replaces the stored sub code with the current sub code, and updates and stores the number of the last piece of music (LTNO) and the largest absolute time (step S43). Then, the system controller 7 compares the current sub code with the previous sub code as done conventionally (step S44). When both match with each other, the system controller 7 repeats a sequence of processes starting from step S41; and when the codes do not match with each other, the system controller 7 stores the current sub code in the memory area where the previous sub code is stored (step S45). Next, it is determined if the pickup has reached the lead-out area (step S46). When the lead-out area has been reached in the case of a read only disk, the system controller 7 judges it as the disk-end and proceeds to the next process. When the pickup has not reached the lead-out area, the current track number is compared with the LTNO (step S47). When the current track number is equal to or smaller than the LTNO, the system controller 7 returns to step S41 and repeats the described process. If the current track number is larger, the system controller 7 judges it as the disk-end and goes to the subsequent process.

According to the CD player of this embodiment, the once-set track number indicating the last piece of information can be updated during playback of a PRD. The track number that should indicate the last piece of recorded information may be erroneously set smaller than the actual track number specifying the location of the last piece of recorded information, as in a case where some area is erroneously discriminated as a mirror-finished portion in a search for the last piece of information due to a scratch on the disk, disk vibration or the like. Even in such a case, when the presence of information in an area following the area having the erroneously set track number during playback is detected, the invention allows the track number indicating the last piece of information to be updated, so that the information of the actual track number can be accessed in a later search. For instance, when a PRD actually having 9 pieces of music information recorded is identified as having only 8 pieces of music information due to some circumstance during playback, the track number set as the LTNO is updated when the ninth piece of music information is detected during playback, so that playback of the ninth piece of music information becomes possible in a later search. Even in fast forward which is done by the Tr-jump, sub codes are read out sequentially and the renewal of the track number is executed as done in playback mode.

As described above, if the presence of any piece of recorded information after the track that has the last track number stored in memory is detected in playback of a PRD, the CD player of the third aspect of the present invention updates the last track number to ensure a search for that piece of information. Even if the track number indicating the last piece of recorded information is erroneously set smaller than the actual one, therefore, the present CD player makes it possible to reproduce effectively all the pieces of recorded information.

What is claimed is:

1. A CD player capable of reproducing information from a CD and reproducing recorded information from a program area of a partially recorded CD, comprising:

unrecorded-area detecting means for detecting an unrecorded area, where no information is recorded, of a disk being played back;

address storing means for updating and storing an address of a current playback position on the disk, and for holding an address of a preceding playback position;

setup operation control means for, when the unrecorded area is detected, performing a setup operation at a position of that detection, and for performing a setup operation at a reference setup position if the setup operation at the position of detection has been unsuccessful;

playback control means for initiating playback from the preceding playback position in accordance with the address held by said address storing means when the setup operation at the reference setup position is complete; and recording-end position discriminating means for discriminating position corresponding to an address stored by said address storing means as a recording end position of said disk when the playback from the preceding playback position and detection of the unrecorded area are repeated a predetermined number of times.

2. A recorded information searching method for a CD player comprising the steps of:

moving a pickup in a first direction through a sequence of jumps, each of the jumps skipping a predetermined number of tracks, of a CD loaded in the CD player to search for a last piece of recorded information in a program area of the CD;

reading and sequentially storing sub codes read at positions of the jumps;

when a reading failure occurs in said reading step, moving the pickup back in a second direction towards a jump position read prior to occurrence of the reading failure;

again moving the pickup in the first direction through track jumps skipping a number of tracks that is equal to or less than a predetermined number of tracks corresponding to a shortest possible program, while reading and sequentially storing the subcodes read at the jump positions; and detecting the last piece of recorded information by registering the sub code read out at a jump position immediately previous to re-occurrence of reading failure.

3. A method for detecting a recording end position of a recordable compact disk which has been only partially filled with program information, comprising the steps of:

(a) monitoring, storing, and updating an address corresponding to a current read position, to provide a latest current address corresponding to a last read position;

(b) ascertaining whether a mirror-finished portion of the compact disk has been detected;

(c) if said ascertaining step is affirmative, attempting a first setup operation a predetermined number of times at substantially the last read position, and determining whether the first setup operation is successful;

(d) if the first setup operation is determined to have been unsuccessful, performing a second setup operation at a reference setup position and determining whether the second setup operation is successful;

(e) if the second setup operation is successful, again ascertaining whether a mirror-finished portion of the compact disk is detected at the last read position; and (f) if said step of again ascertaining is affirmative, determining that the recording end position of the recordable compact disk has been reached.

4. The method for detecting a recording end position according to claim 3, wherein said monitoring step comprises determining whether the latest current address matches with an expected current address.

5. The method for detecting a recording end position according to claim 4, further comprising the step of:

if the latest current address fails to match the expected current address, performing a track jump, in a radially outward direction, to an expected position, corresponding to the expected current address, on the compact disk.

6. The method for detecting a recording end position according to claim 3, wherein said step of monitoring, storing, and updating is performed during a playback operation.

7. The method for detecting a recording end position according to claim 3, wherein said step of monitoring, storing, and updating is performed during a fast-forward operation.

8. The method for detecting a recording end position according to claim 3, further comprising the step of: if the second setup operation is unsuccessful, retrying the second setup operation a predetermined number of times.

9. The method for detecting a recording end position according to claim 8, wherein said retrying step is alternatingly performed at the reference setup position and at an alternative reference setup position that is disposed radially outward, in relation to the reference setup position, on the compact disk.

10. The method for detecting a recording end position according to claim 3, wherein the reference setup position corresponds to a home position on the compact disk.

11. The searching method according to claim 2, wherein, in said step of moving the pickup back in the second direction, the pickup is moved back to a jump position read prior to the occurrence of the reading failure.

12. The searching method according to claim 2, wherein, in said step of moving the pickup back in the second direction:

a process is performed in which the pickup is moved back a given distance and a setup operation is attempted;

if the setup operation is unsuccessful, the process is repeated until the setup operation is successful; and prior to said step of again moving the pickup in the first direction, the pickup is moved in the first direction to a target position corresponding substantially to the jump position read prior to the occurrence of the reading failure.

13. The searching method according to claim 2, wherein:

in said step of moving the pickup back the second direction, the pickup is moved back to a home position of the CD; and prior to said step of again moving the pickup in the first direction, the pickup is moved in the first direction to a target position corresponding substantially to the jump position read prior to the occurrence of the reading failure.

14. A method for updating stored information, indicative of a previously determined last track number, summarizing programming recorded on a recordable compact disk, comprising the steps of:

while reading the disk, monitoring information, indicative of an actual track number of a program currently being read, from a sub code stored on the disk;

comparing the monitored information with the stored information and determining whether the actual track number exceeds the previously determined last track number;

if the actual track number exceeds the previously determined last track number, substituting the actual track number for the previously determined last track number as the stored information.

15. The method according to claim 14, further comprising the step of:

prior to said step of monitoring information, determining if the disk being read is a partially recorded disk.

16. The method according to claim 14, wherein the monitored information and the stored information further include information indicative of the playing time of the program being currently read.

17. The method according to claim 14, wherein the monitored information and the stored information further include information indicative of the overall playing time of the disk being read.

18. The method according to claim 14, wherein said steps of monitoring, comparing and substituting are performed during a playback operation.

19. The method according to claim 14, wherein said steps of monitoring, comparing and substituting are performed during a fast-forward operation.

20. The method according to claim 14, further comprising the step of:

prior to said step of monitoring information, searching to find a last piece of recorded information as the previously determined last track number in response to an access instruction.

21. The method according to claim 20, wherein said step of searching comprises a step of detecting a mirror-finished portion so as to determine the last piece of recorded information.

22. A method for updating stored information, indicative of a previously determined last track number, summarizing programming recorded on a recordable compact disk, comprising the steps of:

moving a pickup in a first direction through a sequence of jumps, each of the jumps skipping a predetermined number of tracks of the compact disk, to search for a last piece of recorded information in a program area of the compact disk;

reading and sequentially storing sub codes read at positions of the jumps;

while reading the disk, monitoring information, indicative of an actual track number of a program currently being read, from a sub code stored on the disk;

comparing the monitored information with the stored information and determining whether the actual track number exceeds the previously determined last track number;

if the actual track number exceeds the previously determined last track number, substituting the actual track number for the previously determined last track number as the stored information;

when a reading failure occurs in said reading step, moving the pickup back in a second direction towards a jump position read prior to occurrence of the reading failure;

again moving the pickup in the first direction through track jumps, skipping a number of tracks that is equal to or less than a predetermined number of tracks corresponding to a shortest possible program, while reading and sequentially storing the sub codes read at the jump position; and detecting the last piece of recorded information, as the previously determined last track number, by registering that sub code read out at a jump position immediately previous to re-occurrence of the reading failure.

* * * * *